(12) United States Patent
Wong et al.

(10) Patent No.: US 12,140,940 B2
(45) Date of Patent: Nov. 12, 2024

(54) DETECTING ANOMALOUS EVENTS USING A MICROCONTROLLER

(71) Applicant: Samsung Electronics Company, Ltd., Suwon si (KR)

(72) Inventors: Erick Wong, Vancouver (CA); Sean O'Brien, Vancouver (CA); Julia Wong, Burnaby (CA)

(73) Assignee: Samsung Electronics Company, Ltd., Suwon (KR)

(*) Notice: Subject to any disclaimer, the term of this patent is extended or adjusted under 35 U.S.C. 154(b) by 391 days.

(21) Appl. No.: 17/142,132

(22) Filed: Jan. 5, 2021

(65) Prior Publication Data

US 2022/0214677 A1   Jul. 7, 2022

(51) Int. Cl.
  *G05B 23/02*    (2006.01)
  *G06N 20/00*    (2019.01)

(52) U.S. Cl.
  CPC ......... *G05B 23/0259* (2013.01); *G06N 20/00* (2019.01)

(58) Field of Classification Search
  CPC ............................ G05B 23/0259; G06N 20/00
  USPC ..................................................... 700/28–55
  See application file for complete search history.

(56) References Cited

U.S. PATENT DOCUMENTS

| | | | |
|---|---|---|---|
| 8,935,383 B2 | 1/2015 | Rodriguez | |
| 8,949,677 B1 | 2/2015 | Brundage | |
| 9,621,422 B2* | 4/2017 | Agrawal | G06F 8/61 |
| 9,652,354 B2 | 5/2017 | Filimonov | |
| 9,753,796 B2* | 9/2017 | Mahaffey | G06F 11/0766 |
| 10,015,184 B1* | 7/2018 | Bell | H04L 63/1425 |
| 10,122,747 B2* | 11/2018 | Mahaffey | G06F 11/3006 |
| 11,807,253 B2* | 11/2023 | Lin | G06N 3/088 |
| 2017/0131758 A1* | 5/2017 | Gettings | G06F 1/3206 |
| 2020/0344314 A1* | 10/2020 | Mellqvist | H04W 4/70 |
| 2020/0364579 A1* | 11/2020 | Misu | G06N 3/084 |
| 2021/0133607 A1* | 5/2021 | Stubbs | G06N 20/00 |
| 2021/0158048 A1* | 5/2021 | Lee | G06V 20/41 |
| 2022/0277225 A1* | 9/2022 | Gilberton | G06K 9/6257 |

(Continued)

FOREIGN PATENT DOCUMENTS

| | | | | |
|---|---|---|---|---|
| JP | 2001143165 A | * | 5/2001 | |
| WO | 2015/140841 | | 9/2015 | |
| WO | WO-2015140841 A1 | * | 9/2015 | G06F 11/07 |

(Continued)

OTHER PUBLICATIONS

Carroll, Aaron, and Gernot Heiser. "An analysis of power consumption in a smartphone." 2010 USENIX Annual Technical Conference (USENIX ATC 10). 2010.pp.1-14 (Year: 2010).*

(Continued)

*Primary Examiner* — Satish Rampuria
(74) *Attorney, Agent, or Firm* — Baker Botts L.L.P.

(57) ABSTRACT

In one embodiment, a method performed by a microcontroller of an electronic device includes accessing one or more real-time sensor data associated with one or more sensors of the electronic device, determining, by a machine-learning model running on the microcontroller, that an anomalous event has occurred on the electronic device by processing the one or more real-time sensor data with the machine-learning model, and sending, upon the determination that the anomalous event has occurred, a notification regarding the anomalous event to an application running on the electronic device.

20 Claims, 8 Drawing Sheets

(56) References Cited

U.S. PATENT DOCUMENTS

2022/0308572 A1* 9/2022 Rao ............... G05B 23/0283

FOREIGN PATENT DOCUMENTS

| WO | 2017/214178 | 12/2017 | | |
|---|---|---|---|---|
| WO | WO-2017214178 A1 * | 12/2017 | ............. | G08B 21/18 |
| WO | WO-2018053076 A1 * | 3/2018 | ............. | G06F 17/15 |

OTHER PUBLICATIONS

Sample, Alanson P., et al. "Design of an RFID-based battery-free programmable sensing platform." IEEE transactions on instrumentation and measurement 57.11 (2008): pp. 2608-2615. (Year: 2008).*

Zhou, Z. X., et al. "Applying deep learning and wearable devices for educational data analytics." 2019 IEEE 31st International Conference on Tools with Artificial Intelligence (ICTAI). IEEE, 2019.pp. 871-878 (Year: 2019).*

Fahim, Muhammad, and Alberto Sillitti. "Anomaly detection, analysis and prediction techniques in iot environment: A systematic literature review." IEEE Access 7 (2019): pp. 81664-81681. (Year: 2019).*

Alsheikh, Mohammad Abu, et al. "Machine learning in wireless sensor networks: Algorithms, strategies, and applications." IEEE Communications Surveys & Tutorials 16.4 (2014): pp. 1996-2018. (Year: 2014).*

Yu, Jiadi, et al. "Fine-grained abnormal driving behaviors detection and identification with smartphones." IEEE transactions on mobile computing 16.8 (2016):pp. 2198-2212. (Year: 2016).*

* cited by examiner

DETECTING ANOMALOUS EVENTS USING A MICROCONTROLLER

TECHNICAL FIELD

This disclosure relates generally to mobile electronic device managements, and in particular relates to detecting anomalous events on a mobile electronic device.

BACKGROUND

A mobile electronic device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile electronic devices may also execute software applications, such as games, web browsers, or social-networking applications. A mobile electronic device may experience abnormal behaviors of hardware or software.

DESCRIPTION OF EXAMPLE EMBODIMENTS

Mobile Client System Overview

Figure 1:
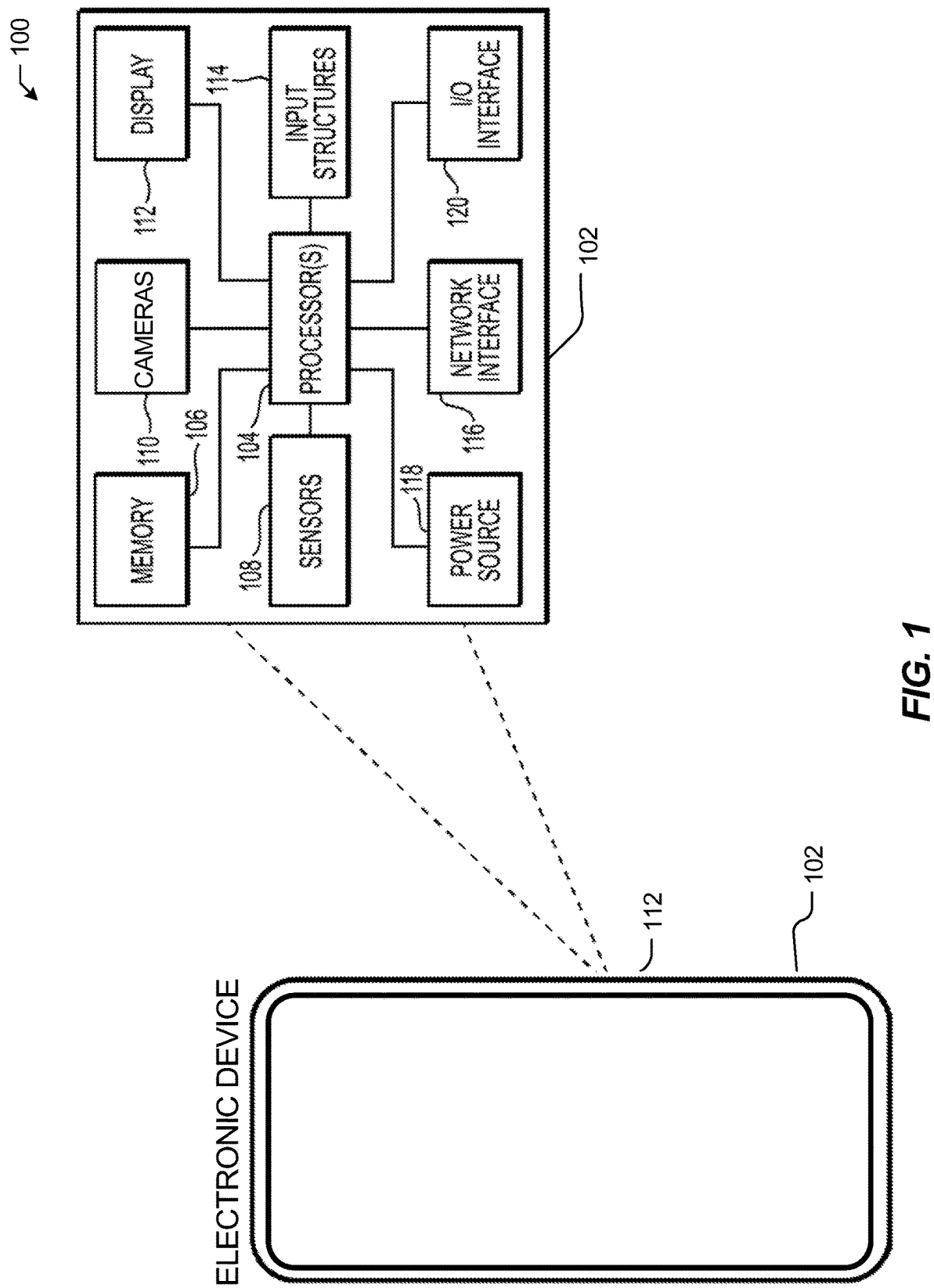
FIG. 1 illustrates an example electronic device, in accordance with presently disclosed embodiments.

FIG. 1 illustrates an example electronic device 100, in accordance with presently disclosed embodiments. In particular embodiments, the electronic device 100 may include, for example, any of various personal electronic devices 102, such as a mobile phone electronic device, a tablet computer electronic device, a laptop computer electronic device, and so forth. In particular embodiments, as further depicted by FIG. 1, the personal electronic device 102 may include, among other things, one or more processor(s) 104, memory 106, sensors 108, cameras 110, a display 112, input structures 114, network interfaces 116, a power source 118, and an input/output (I/O) interface 120. It should be noted that FIG. 1 is merely one example of a particular implementation and is intended to illustrate the types of components that may be included as part of the electronic device 100.

In particular embodiments, the one or more processor(s) 104 may be operably coupled with the memory 106 to perform various algorithms, processes, or functions. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 100 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display 112 may include any display architecture (e.g., AMLCD, AMOLED, micro-LED, and so forth), which may provide further means by which users may interact and engage with the electronic device 100. In particular embodiments, as further illustrated by FIG. 1, one more of the cameras 110 may be disposed behind, underneath, or alongside the display 112 (e.g., one or more of the cameras 110 may be partially or completely concealed by the display 112), and thus the display 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display 110, such as at a center area behind the display 110, at an upper area behind the display 110, or at a lower area behind the display 110.

In particular embodiments, the input structures 114 may include any physical structures utilized to control one or more global functions of the electronic device 100 (e.g., pressing a button to power "ON" or power "OFF" the electronic device 100). The network interface 116 may include, for example, any number of network interfaces suitable for allowing the electronic device 100 to access and receive data over one or more cloud-based networks (e.g., a cloud-based service that may service hundreds or thousands of the electronic device 100 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 100 for operation. Similarly, the I/O interface 120 may be provided to allow the electronic device 100 to interface with various other electronic or computing devices, such as one or more auxiliary electronic devices.

Detecting Anomalous Events

Figure 2:
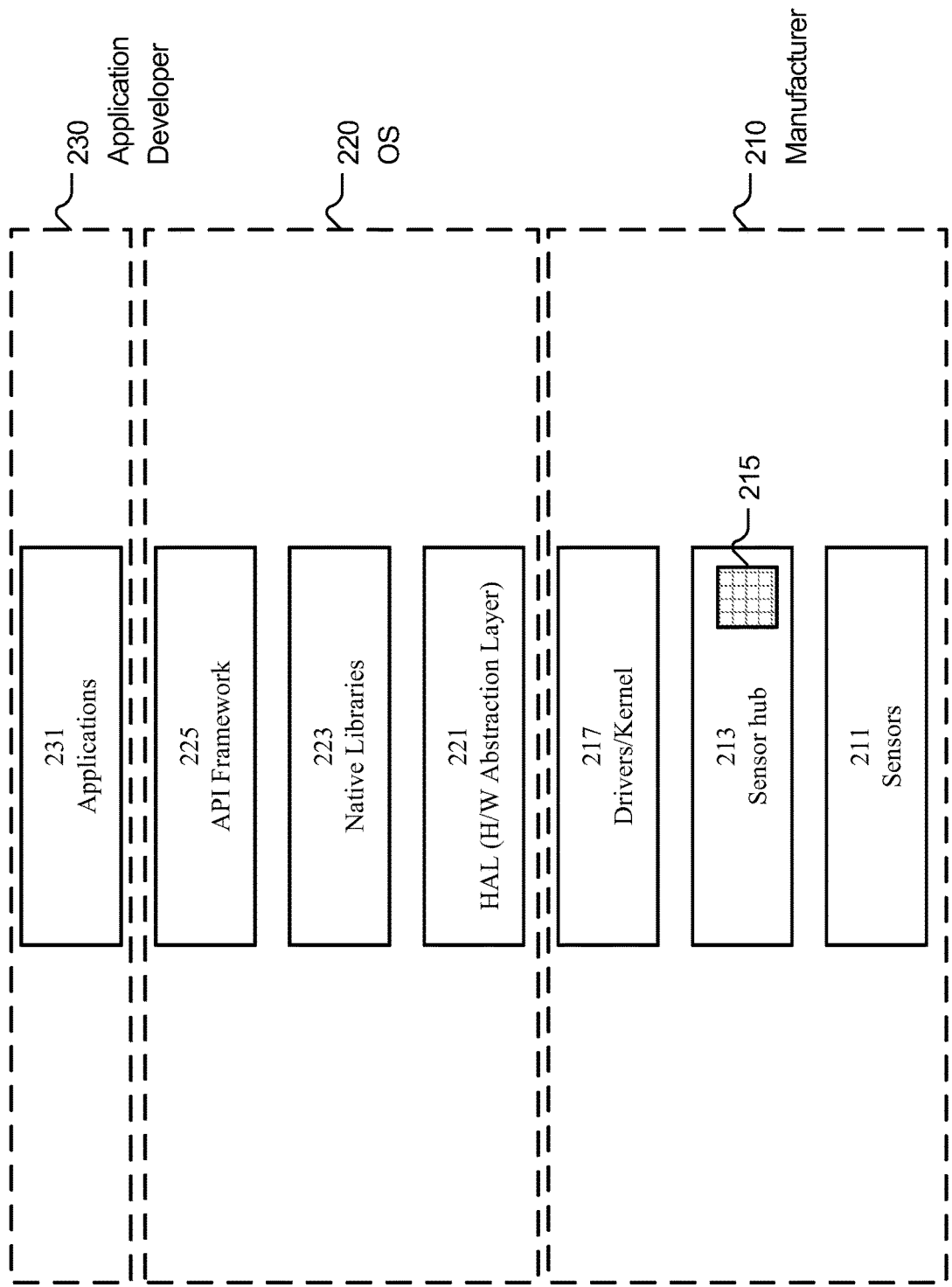
FIG. 2 illustrates an example sensor stack on an electronic device.

FIG. 2 illustrates an example sensor stack on an electronic device 100. One or more sensors 211 may collect sensor data from corresponding hardware. The one or more sensors 211 may comprise hardware-based sensors or software-based sensors. A sensor hub 213 may be a microcontroller unit that helps to integrate data from different sensors and process them. The sensor hub 213 may off-load the sensor data processing jobs from a processor, thus may save battery consumption and provide a performance improvement. Drivers/kernel 217 may provide a software interface to hardware devices. The drivers/kernel may enable an Operating System (OS) and other computer programs to access hardware functions without needing to know precise details about the hardware being used. The sensors 211, the sensor hub 213, and the drivers/kernel 217 of an electronic device 100 may be provided by the manufacturer 210 of the electronic device 100. The Hardware Abstraction Layer (HAL) 221 may be a layer of programming that may allow the OS to interact with a hardware device at a general or abstract level rather than at a detailed hardware level. The native libraries 223 may be a set of modules that may provide accesses to native services of the OS. The API framework 225 may allow applications 231 to access the native libraries 223. The HAL 221, the native libraries 223, and the API framework 225 may be provided by an OS 220. The applications 231, provided by corresponding applications developers 230, may be a program mainly designed to provide services to end-users. Examples of the application 231 may include, but not limited to, messengers, email clients, image viewers, games, or any suitable applications. In particular embodiments, data may flow in the upward direction. Control may flow in the downward direction. In particular embodiments, the electronic device 100 may comprise one or more displays 112, one or more non-transitory computer-readable storage media 106, one or more processors 104 coupled to the storage media 106, one or more sensors 211, and a microcontroller 213. In particular embodiments, the electronic device 100 may be a mobile electronic device. In particular embodiments, the microcontroller 213 may be a sensor hub associated with the electronic device 100. The microcontroller 213 may access one or more real-time sensor data associated with the one or more sensors 211. The one or more real-time sensor data may comprise a current clock speed for one of the one or more processors, a current storage media utilization, a current battery level, a current network utilization, a current status for one of the one or more displays, a current device temperature, or any suitable real-time sensor data associated with the electronic device 100. The microcontroller 213 may determine that an anomalous event has occurred on the electronic device 100 by processing the one or more real-time sensor data with a machine-learning model 215 running on the microcontroller 213. In particular embodiments, the machine-learning model 215 may be a Tiny Machine Learning (TinyML)-based model. The microcontroller 213 may send a notification regarding the anomalous event to a system level application 231 running on the electronic device 100 upon the determination that the anomalous event has occurred. The microcontroller 213 may trigger a system interrupt to send the notification. In particular embodiments, the system level application 231 may take further actions to determine whether the anomalous event is associated with an abnormal operation mode of the electronic device 100. The system level application 231 may provide a result of the determination whether the anomalous event is associated with an abnormal operation mode of the electronic device 100 to the microcontroller 213. Upon receiving the result from the application 231, the microcontroller 213 may update the machine-learning model 215 based on the received result. As used herein, "electronic devices having hardware configurations substantially similar to a particular electronic device" may refer to electronic devices having hardware configurations identical to the hardware configurations of the particular electronic device with zero or more minor exceptions. As used herein, "electronic devices having software configurations substantially similar to a particular electronic device" may refer to electronic devices having software configurations identical to the hardware configurations of the particular electronic device with zero or more minor exceptions. Although this disclosure describes determining that an anomalous event has occurred on an electronic device using a microcontroller in a particular manner, this disclosure contemplates determining that an anomalous event has occurred on an electronic device using a microcontroller in any suitable manner.

Certain technical challenges exist for monitoring performance and utilizations of hardware resources to determine whether an anomalous event has occurred on an electronic device 100. Legacy electronic device may have utilized one or more system level applications to monitor the performance and the utilization of the underlying hardware. The one or more system level applications may send raw device data to a cloud application at a predefined interval for a deeper analysis. One technical challenge for this approach may include consuming of unnecessary device resources including computing, storage, and network resources. The system level applications may need to collect and store the raw device data and send the collected/stored raw device data to the cloud application at the predefined interval. Those activities may consume computing, storage, and network resources of the electronic device. Another technical challenge may include consuming of battery. A mobile electronic device may be battery powered. When the system level applications collect raw device data or send the raw device data to the cloud application, the electronic device may need to enter into an active mode from an idle mode. The electronic device in active mode may consume significantly more battery than in idle mode. The solution presented by the embodiments disclosed herein to address these challenges may be utilizing a microcontroller 213 for an always-on monitoring of the performance and the utilization of underlying hardware. The microcontroller 213 may access sensor data from one or more sensors 211. The microcontroller may process the sensor data with a machine-learning model 215 running on the microcontroller 213 to determine whether an anomalous event has occurred on the electronic device 100.

Certain embodiments disclosed herein may provide one or more technical advantages. A technical advantage of the embodiments may include avoiding unnecessary consumption of device resources. The microcontroller 213, a sensor hub, may be able to access sensor data from the one or more sensors 211 and the microcontroller analyze the accessed sensor data using the machine-learning model 215 running on the microcontroller 213. Thus, the embodiments disclosed herein may avoid unnecessary consumption of device resources. Another technical advantage of the embodiments may include reducing battery consumption. The analysis on the microcontroller 213 may not cause the electronic device 100 to enter into the active mode. Thus, the embodiments disclosed herein may reduce battery consumption caused by the monitoring performance and utilizations of hardware resources in the legacy electronic devices. Yet another technical advantage of the embodiments may include customizing analysis to a device or a group of devices and/or a user or a group of users. The machine-learning model 215 for determining whether an anomalous event has occurred on the electronic device 100 may be trained using collected data from electronic devices having hardware configurations substantially similar to the hardware configurations of the electronic device 100 and/or having software configurations substantially similar to the software configurations of the electronic device 100. The machine-learning model 215 for determining whether an anomalous event has occurred on the electronic device 100 may be updated based on data from the electronic device 100 itself. The electronic device 100 may have a particular hardware and software configurations. The electronic device 100 may be used by a particular user. The data collected from the electronic device 100 may reflect the particular hardware and software configurations as well as particular usage patterns associated with the particular user. Certain embodiments disclosed herein may provide none, some, or all of the above technical advantages. One or more other technical advantages may be readily apparent to one skilled in the art in view of the figures, descriptions, and claims of the present disclosure.

In particular embodiments, an electronic device 100 may comprise one or more displays 112, one or more non-transitory computer-readable storage media 106, one or more processors 104 coupled to the storage media 106, one or more sensors 211, and a microcontroller 213. In particular embodiments, the electronic device 100 may be a mobile electronic device. In particular embodiments, the microcontroller 213 may be a sensor hub associated with the electronic device 100. The microcontroller 213 may access one or more real-time sensor data associated with the one or more sensors 211. As an example and not by way of limitation, a mobile phone 100 may comprise a touch display 112, memory 106, one or more processors 104, one or more sensors 211 for hardware monitoring, and a sensor hub 213. The sensor hub 213 may be a microcontroller. The sensor hub 213 was originally introduced to off-load sensor data processing load from the one or more processors 104. The sensor hub 213 may save battery consumption and provide a performance improvement of the mobile phone 100. The mobile phone may further comprise a battery-based power source 118, network interface 116 and I/O interfaces 120. Although this disclosure describes a particular electronic device to monitor performance and utilization of the underlying hardware, this disclosure contemplates any suitable electronic device to monitor performance and utilization of the underlying hardware.

In particular embodiments, the one or more real-time sensor data may comprise a current clock speed for one of the one or more processors 104, a current utilization of the storage media 106, a current level of battery, a current network connectivity, a current network utilization, a current status for one of the one or more displays 112, a current device temperature, or any suitable real-time sensor data associated with the electronic device 100. As an example and not by way of limitation, continuing with a prior example, the mobile phone may have one or more sensors 221. Each of the one or more sensors 221 may be associated with the one or more processors 104, the one or more non-transitory computer-readable storage media 106, the one or more displays 112, the battery-based power source 118, the network interface 116, the I/O interfaces 120 or any suitable hardware component of the mobile device. Each of the one or more sensors 221 may monitor a corresponding hardware component and generate corresponding sensor data. The sensor hub 223 of the mobile phone 100 may access the generated sensor data. The generated sensor data. Although this disclosure describes particular real-time sensor data generated by particular sensors, this disclosure contemplates any suitable real-time sensor data generated by any suitable sensors.

In particular embodiments, the microcontroller 213 may determine that an anomalous event has occurred on the electronic device 100 by processing the one or more real-time sensor data with a machine-learning model running on the microcontroller 213. In particular embodiments, the microcontroller 213 may process the one or more real-time sensor data with the machine-learning model 215 at a regular interval. In particular embodiments, the machine-learning model 215 may take a snapshot of the one or more real-time sensor data as input. In particular embodiments, the machine-learning model 215 may be a recursive neural network that considers a trend of the one or more real-time sensor data to produce an output. In particular embodiments, the machine-learning model 215 may be a binary classifier that may determine whether an anomalous event has occurred on the electronic device 100. In particular embodiments, the machine-learning model 215 may be a multiclass classifier that may determine what type of anomalous event has occurred. As an example and not by way of limitation, continuing with a prior example, a TinyML-based classifier 215 may be installed on the sensor hub 213. TinyML may be used for embedded machine-learning applications. TinyML may be optimized for resource constrained environments. For example, a TinyML-based machine-learning model may run on a microcontroller with a few kilobytes memory and the processing power in a few megahertz. The sensor hub 213 may process the sensor data from the one or more sensors 211 with the classifier 215 at a predefined interval. The classifier 215 may be a Long Short-Term Memory (LSTM) model that may take a sequence of the sensor data to determine whether an anomalous event has occurred on the mobile phone 100. In particular embodiments, the classifier 215 may produce a binary output indicating whether an anomalous event has occurred on the mobile phone 100 or not. In particular embodiments, the classifier 215 may produce one of a plural values. Each of the plural values may indicate a type of anomalous event including, but not limited to, no anomalous event, an anomalous event associated with overloaded processors, an anomalous event associated with high memory utilization, an anomalous event associated with lost network connectivity, an anomalous event associated with high network utilization, an anomalous event associated with high device temperature, or an anomalous event associated with any suitable condition for an anomalous event. Although this disclosure describes determining that an anomalous event has occurred on an electronic device in a particular manner, this disclosure contemplates determining that an anomalous event has occurred on an electronic device in any suitable manner.

Figure 3:
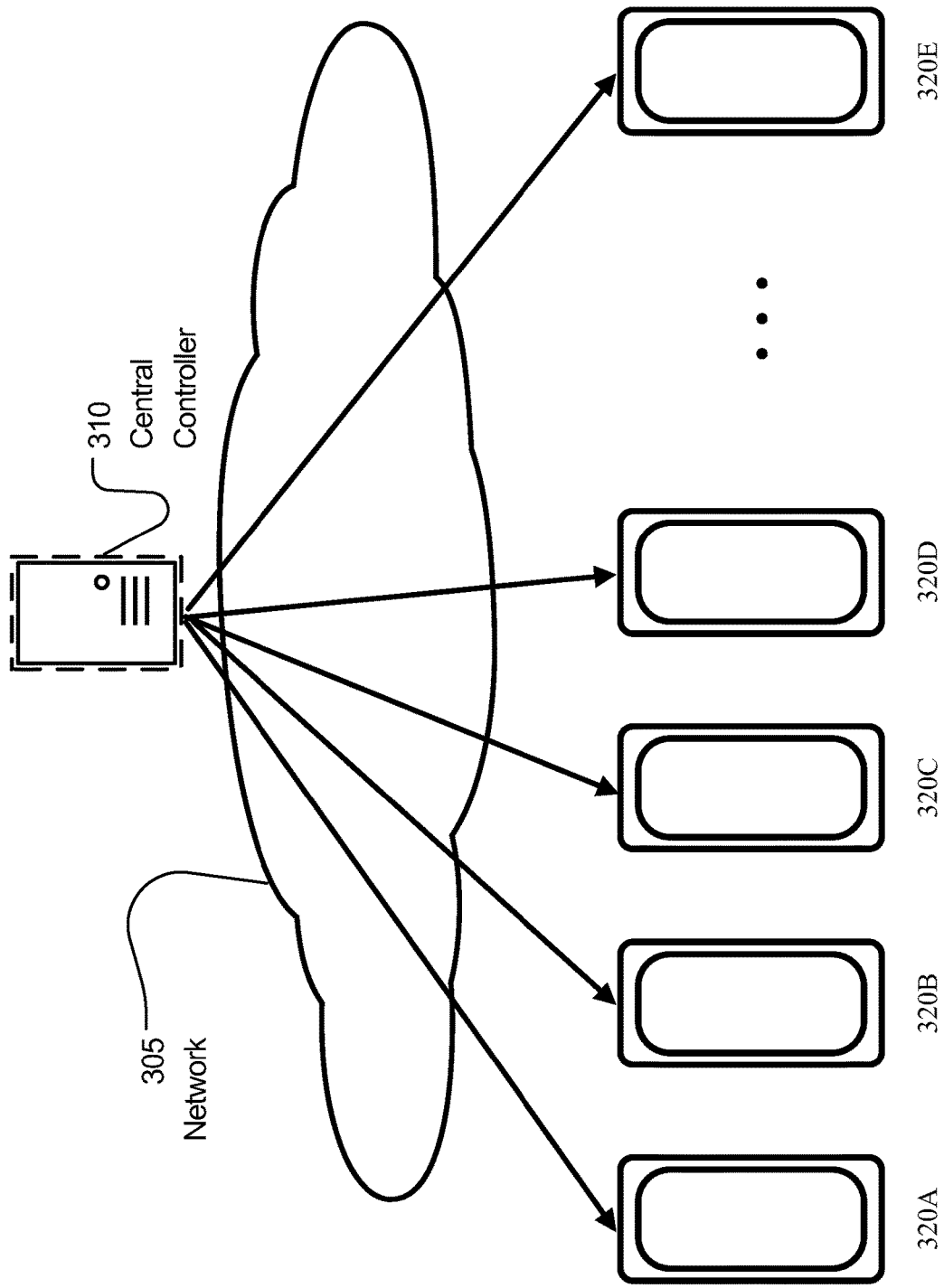
FIG. 3 illustrates an example scenario for deploying a pre-trained machine-learning model to electronic devices.

In particular embodiments, the machine-learning model 215 may have been trained using sensor data collected from electronic devices having hardware configurations substantially similar to the electronic device 100. The collected sensor data may be labelled. FIG. 3 illustrates an example scenario for deploying a pre-trained machine-learning model to electronic devices. As an example and not by way of limitation, illustrated in FIG. 3, an employer may distribute smartphones 320A, 320B, 320C, 320D, and 320E to its employees. The distributed smartphones may be one of a number of selected models from a smartphone manufacturer. Thus, hardware configurations for those distributed smartphones may be substantially similar to each other. The employer may want to deploy a microcontroller-based system monitoring tool on each of the distributed smartphones 320A, 320B, 320C, 320D, and 320E. A central controller 310 may have a pre-trained machine-learning model with training data collected from electronic devices that have hardware configurations substantially similar to each of the distributed smartphones 320A, 320B, 320C, 320D, and 320E. The collected training data may have been labelled. The central controller 310 may load the pre-trained machine-learning model to each of the distributed smartphones 320A, 320B, 320C, 320D, and 320E through a network 305 when each of the distributed smartphones 320A, 320B, 320C, 320D, and 320E is activated. The central controller 310 may update the pre-trained machine-learning model with new training data. Then, the central controller 310 may replace the loaded machine-learning model on each of the distributed smartphones 320A, 320B, 320C, 320D, and 320E with the updated pre-trained machine-learning model through the network 305. In particular embodiments, the central controller 310 may be associated with the employer. In particular embodiments, the central controller 310 may be associated with the manufacturer of the distributed smartphones 320A, 320B, 320C, 320D, and 320E. Although this disclosure describes loading a machine-learning model trained with training data collected from electronic devices having hardware configurations substantially similar to an electronic device in a particular manner, this disclosure contemplates loading a machine-learning model trained with training data collected from electronic devices having hardware configurations substantially similar to an electronic device in any suitable manner.

In particular embodiments, the machine-learning model may have been trained using sensor data collected from electronic devices having software configurations substantially similar to the electronic device 100. The collected sensor data may be labelled. As an example and not by way of limitation, continuing with a prior example illustrated in FIG. 3, a set of work-related applications may be installed on the distributed smartphones 320A, 320B, 320C, 320D, and 320E. Each of the distributed smartphones 320A, 320B, 320C, 320D, and 320E may also have a number of applications installed by a corresponding employee. Thus, the distributed smartphones 320A, 320B, 320C, 320D, and 320E may have software configurations substantially similar to each other. A central controller 310 may have a pre-trained machine-learning model with training data collected from electronic devices that have the set of work-related applications. Thus, the electronic devices that have produced the training data may have software configurations substantially similar to each of the distributed smartphones 320A, 320B, 320C, 320D, and 320E. The collected training data may have been labelled. The central controller 310 may load the pre-trained machine-learning model to each of the distributed smartphones 320A, 320B, 320C, 320D, and 320E through a network 305 when each of the distributed smartphones 320A, 320B, 320C, 320D, and 320E is activated. The central controller 310 may update the pre-trained machine-learning model with new training data collected from electronic device having software configurations substantially similar to each of the distributed smartphones 320A, 320B, 320C, 320D, and 320E. Then, the central controller 310 may replace the loaded machine-learning model on each of the distributed smartphones 320A, 320B, 320C, 320D, and 320E with the updated pre-trained machine-learning model through the network 305. Although this disclosure describes loading a machine-learning model trained with training data collected from electronic devices having software configurations substantially similar to an electronic device in a particular manner, this disclosure contemplates loading a machine-learning model trained with training data collected from electronic devices having software configurations substantially similar to an electronic device in any suitable manner.

Figure 4:
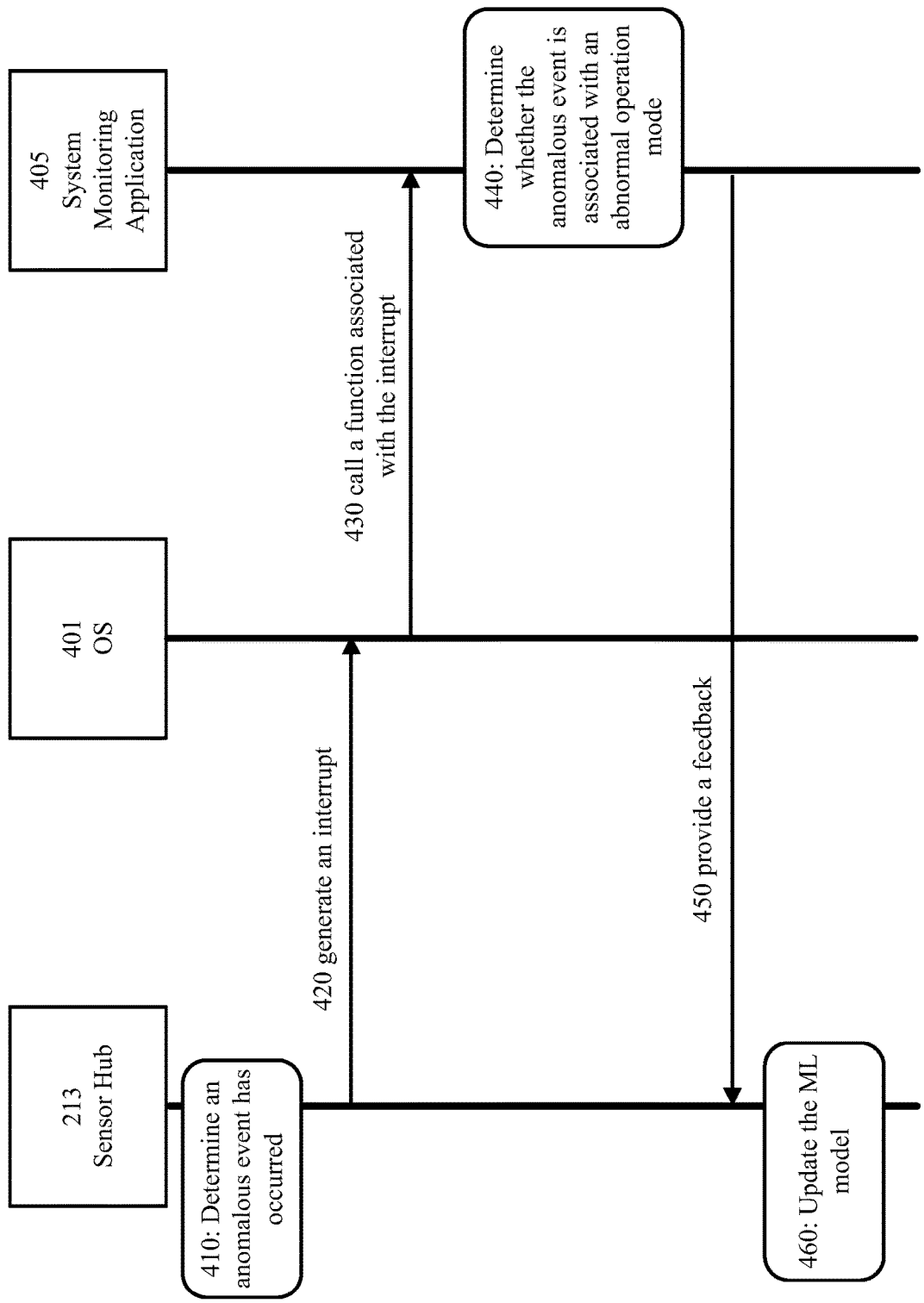
FIG. 4 illustrates an example delivery of a notification using a system interrupt.

In particular embodiments, the microcontroller 213 may send a notification regarding the anomalous event to an application running on the electronic device 100 upon the determination that the anomalous event has occurred. In particular embodiments, the microcontroller 213 may trigger a system interrupt to send the notification. In particular embodiments, the microcontroller 213 may send a notification to the application in any suitable way other than triggering a system interrupt. FIG. 4 illustrates an example delivery of a notification using a system interrupt. As an example and not by way of limitation, illustrated in FIG. 4, a sensor hub 213, at step 410, may determine that an anomalous event has occurred on the electronic device 100 by processing the real-time sensor data with a machine-learning model 215 running on the sensor hub 213. At step 420, the sensor hub 213 may generate a system interrupt to send a notification to a system monitoring application 405 on the electronic device 100. The operating system 401 on the electronic device may halt a module running on one of the processors 104 and store the state information associated with the halted module. At step 430, the operating system 401 may resume the system monitoring application 405 on the one of the processors 104 by calling a function of the system monitoring application 405 associated with the interrupt. Although this disclosure describes sending a notification regarding an anomalous event to an application in a particular manner, this disclosure contemplates sending a notification regarding an anomalous event to an application in any suitable manner.

In particular embodiments, the application 405 may take further actions to determine whether the anomalous event is associated with an abnormal operation mode of the electronic device 100. In particular embodiments, at least one hardware component of the electronic device 100 may be malfunctioning when the electronic device 100 is in the abnormal operation mode. In particular embodiments, at least one software component of the electronic device 100 may be malfunctioning when the electronic device 100 is in the abnormal operation mode. As an example and not by way of limitation, continuing with a prior example illustrated in FIG. 4, at step 440, the system monitoring application 405 may take further actions to determine whether the anomalous event is associated with an abnormal operation mode of the electronic device 100. In particular embodiments, for taking the further actions, the system monitoring application 405 may access the real-time sensor data used for determining that an anomalous event has occurred by the sensor hub 213. The system monitoring application 405 may collect additional data from hardware and software of the electronic device 100. In particular embodiments, the system monitoring application 405 may analyze the accessed sensor data and the collected additional data to determine whether the anomalous event is associated with an abnormal operation mode of the electronic device 100. The system monitoring application 405 may use a machine-learning model for the analysis. In particular embodiments, the system monitoring application 405 may send the accessed sensor data and the collected additional data to a cloud application. The cloud application may perform a deep analysis on the received sensor data and the collected additional data to determine whether the anomalous event is associated with an abnormal operation mode. The cloud application may send a response including a result to the system monitoring applications 405. The cloud application may store the received sensor data and the result of the deep analysis. The stored sensor data and the result may be used as training data for training the pre-trained machine-learning model in the example illustrated in FIG. 3. Although this disclosure describes particular actions for determining whether the anomalous event is associated with an abnormal operation mode of the electronic device, this disclosure contemplates any suitable actions for determining whether the anomalous event is associated with an abnormal operation mode of the electronic device.

Figure 5:
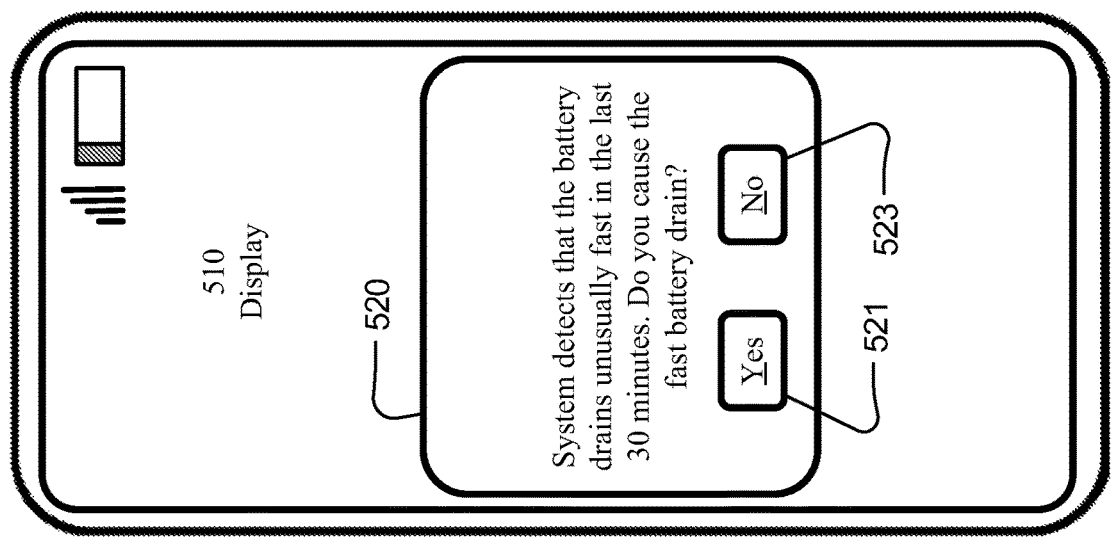
FIG. 5 illustrates an example visual notification regarding an anomalous event.

In particular embodiments, the application 405 may provide a visual notification to a user on one or more of the displays 112. The visual notification may comprise one or more choices for the user to provide a confirmation or a rejection to the visual notification. The application may receive a selection among the one or more choices from the user. FIG. 5 illustrates an example visual notification regarding an anomalous event. As an example and not by way of limitation, illustrated in FIG. 5, continuing with a prior example illustrated in FIG. 4, the system monitoring application 405 may provide a message box 520 on a touch-enabled display 510 of the electronic device 100. The message box 520 may comprise a message: "System detects that the battery drains unusually fast in the last 30 minutes. Do you cause the fast battery drain?" In the example illustrated in FIG. 5, the anomalous event may be associated with fast battery drain. In particular embodiments, the system monitoring application 405 may identify a type of the anomalous event based on the notification from the sensor hub 213. In particular embodiments, the system monitoring application 405 may identify a type of the anomalous event based on an analysis of additional information gathered by the system monitoring application 405. In particular embodiments, the system monitoring application 405 may identify a type of the anomalous event based on a feedback from the cloud application. The message box may also comprise two buttons 521 and 523 for the user to select her answer to the given question. If the user has been playing a video game that consume the battery fast on the electronic device 100, the user may select 'Yes' 521 to indicate that the anomalous event is caused by the user. Thus, the electronic device 100 may not be in an abnormal operation mode. Based on this selection of the user, the machine-learning model 215 may be updated such that a probability for determining that an anomalous event has occurred on the electronic device 100 based on the substantially similar sensor data is reduced. If the user is not aware of any activity that potentially drain the battery fast, the user may select 'No' 523. On receiving 'No' 523 from the user in this particular example, the system monitoring application 405 may determine that the anomalous event is associated with an abnormal operation mode of the electronic device 100. Although this disclosure describes a particular user interface for getting input associated with the anomalous event from a user, this disclosure contemplates any suitable user interface for getting input associated with the anomalous event from a user.

In particular embodiments, the application may provide a result of the determination whether the anomalous event is associated with an abnormal operation mode of the electronic device 100 to the microcontroller 213. As an example and not by way of limitation, continuing with a prior example illustrated in FIG. 4, the system monitoring application 405, at step 450, may provide a feedback including a result of the determination whether the anomalous event is associated with an abnormal operation mode of the electronic device 100 to the sensor hub 213. The result of determination may be that the anomalous event is associated with an abnormal operation mode, or the anomalous event is not associated with an abnormal operation mode. In particular embodiments, the system monitoring application 405 may determine whether the anomalous event is associated with an abnormal operation mode of the electronic device 100 based on an analysis performed by the system monitoring application 405. In particular embodiments, the system monitoring application 405 may determine whether the anomalous event is associated with an abnormal operation mode of the electronic device 100 based on a feedback from the cloud application after providing data to the cloud application. In particular embodiments, the system monitoring application 405 may determine whether the anomalous event is associated with an abnormal operation mode of the electronic device 100 based on an input from a user associated with the electronic device 100. Although this disclosure describes providing a feedback to the microcontroller in a particular manner, this disclosure contemplates providing a feedback to the microcontroller in any suitable manner.

In particular embodiments, the microcontroller 213 may receive the result from the application. The microcontroller 213 may update the machine-learning model based on the received result. As an example and not by way of limitation, continuing with a prior example illustrated in FIG. 4, the sensor hub 213, at step 450, may receive a feedback indicating a result of the determination whether the anomalous event is associated with an abnormal operation mode of the electronic device 100 from the system monitoring application 405. The sensor hub 213 may update the machine-learning model 215 running on the sensor hub 213 with the sensor data used for determining that the anomalous event has occurred on the electronic device 100 and the feedback from the system monitoring application 405. The feedback may be used as a label for the sensor data used for determining the anomalous event has occurred on the electronic device 100. With a pair of the sensor data and the feedback, the machine-learning model 215 may be updated. The sensor hub 213 may produce a result by processing the sensor data with the machine-learning model 215. The sensor hub 213 may compute a loss by comparing the produced result and the feedback from the system monitoring application 405. The sensor hub 213 may compute gradients based on the computed loss. The sensor hub 213 may update parameters of the machine-learning model 215 during a gradient descent backpropagation procedure. Although this disclosure describes updating a machine-learning model based on a feedback from an application in a particular manner, this disclosure contemplates updating a machine-learning model based on a feedback from an application in any suitable manner.

In particular embodiments, the electronic device 100 may enter into an idle mode when the electronic device 100 has not detected any activity on installed applications for a pre-determined duration of time. The electronic device 100 enters into an active mode when the electronic device 100 detects an activity on any of the installed applications. The microcontroller 213 may keep the determining regardless of a mode the electronic device 100 is on. As an example and not by way of limitation, continuing with a prior example illustrated in FIG. 4, the electronic device 100 in the idle mode may not enter into the active mode when the sensor hub 213 accesses the sensor data, or analyzes the accessed sensor data using the machine-learning model 215. The electronic device 100 may enter into the active mode only when the system monitoring application 405 is taking further actions upon receiving a notification from the sensor hub 213. Since the sensor hub 213 performs operations independent of the mode of the electronic device 100, an always-on monitoring of the performance and the utilization of the underlying hardware on the sensor hub 213 may preserve the battery considerably compared to a monitoring of the performance and the utilization of the hardware on a system level application. Although this disclosure describes preserving battery using a microcontroller in a particular manner, this disclosure contemplates preserving battery using a microcontroller in any suitable manner.

Figure 6:
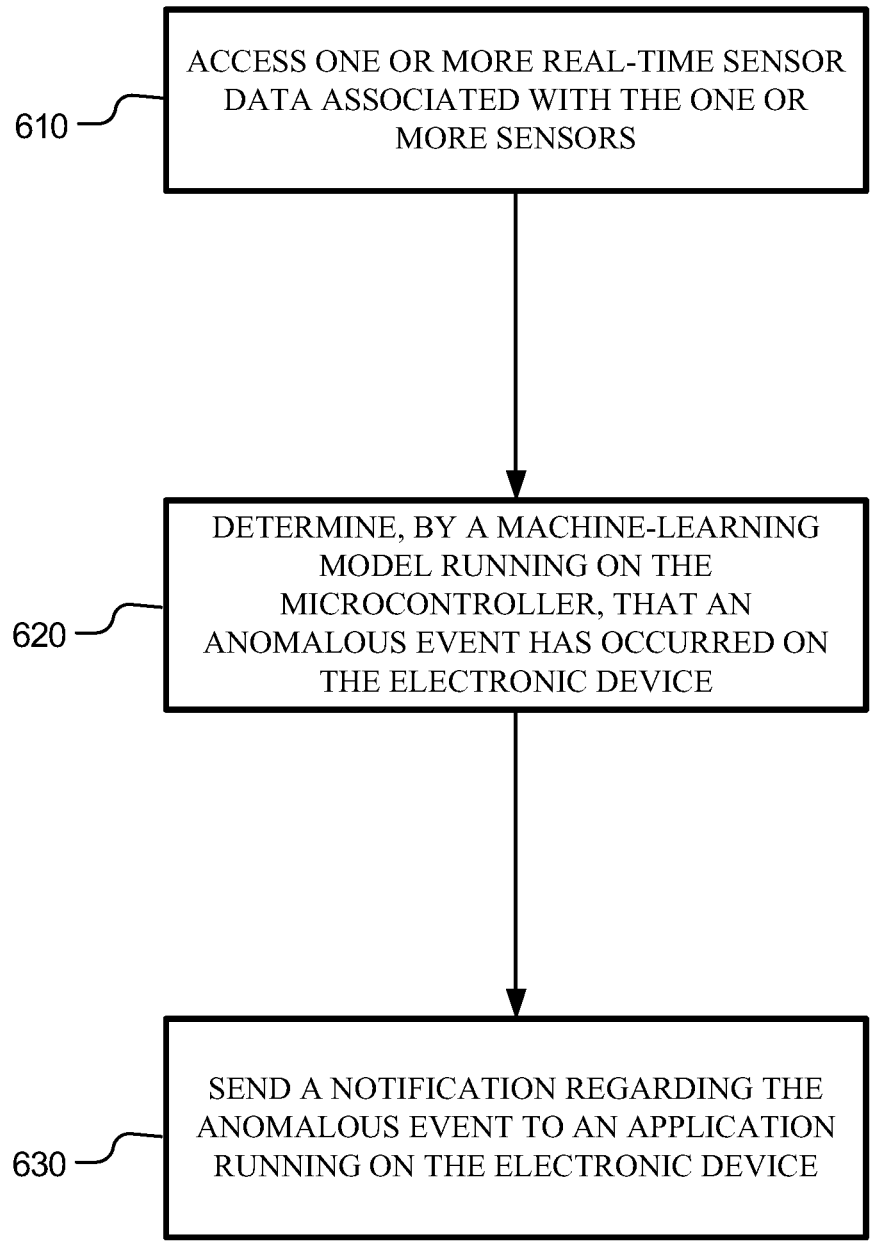
FIG. 6 illustrates an example method for determining whether an anomalous event has occurred on an electronic device.

FIG. 6 illustrates is a flow diagram of a method 600 for determining whether an anomalous event has occurred on an electronic device, in accordance with the presently disclosed embodiments. The method 600 may begin at step 610, where a microcontroller associated with an electronic device may access one or more real-time sensor data associated with the one or more sensors. At step 620, the microcontroller may determine that an anomalous event has occurred on the electronic device by processing the one or more real-time sensor data with a machine-learning model that is running on the microcontroller. At step 630, the microcontroller may send, upon the determination that the anomalous event has occurred, a notification regarding the anomalous event to an application running on the electronic device. Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining whether an anomalous event has occurred on an electronic device including the particular steps of the method of FIG. 6, this disclosure contemplates any suitable method for determining whether an anomalous event has occurred on an electronic device including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Systems and Methods

Figure 7:
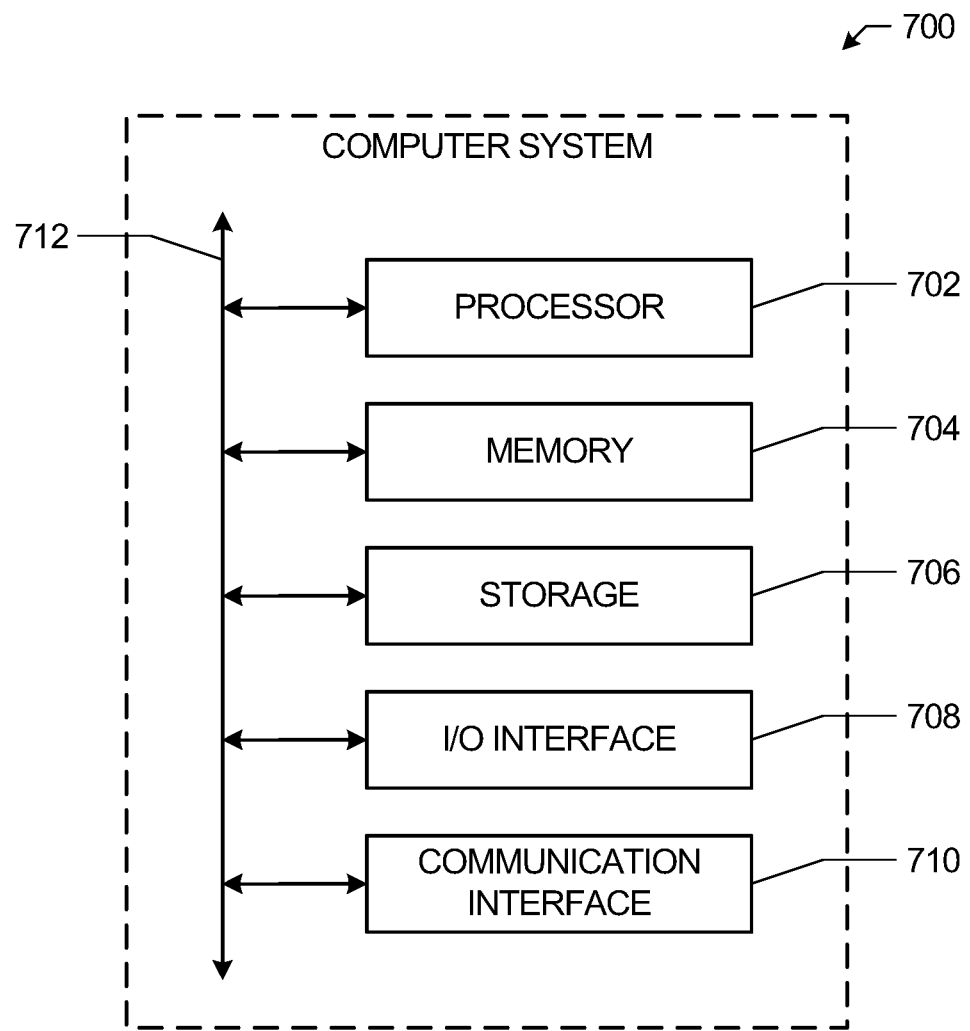
FIG. 7 illustrates an example computer system.

FIG. 7 illustrates an example computer system 700 that may be utilized to perform determining whether an anomalous event has occurred on an electronic device, in accordance with the presently disclosed embodiments. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks.

Where appropriate, one or more computer systems 700 may perform without substantial spatial or temporal limitation one or more steps of one or more methods described or illustrated herein. As an example, and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement. In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example, and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702.

Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors

702. Although this disclosure describes and illustrates a particular processor, this disclosure contemplates any suitable processor.

In particular embodiments, memory 704 includes main memory for storing instructions for processor 702 to execute or data for processor 702 to operate on. As an example, and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere).

One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memory devices 704, where appropriate. Although this disclosure describes and illustrates particular memory, this disclosure contemplates any suitable memory.

In particular embodiments, storage 706 includes mass storage for data or instructions. As an example, and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 706 for them. Where appropriate, I/O interface 708 may include one or more device or software drivers enabling processor 702 to drive one or more of these I/O devices. I/O interface 708 may include one or more I/O interfaces 706, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it.

As an example, and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example, and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

AI Architecture

Figure 8:
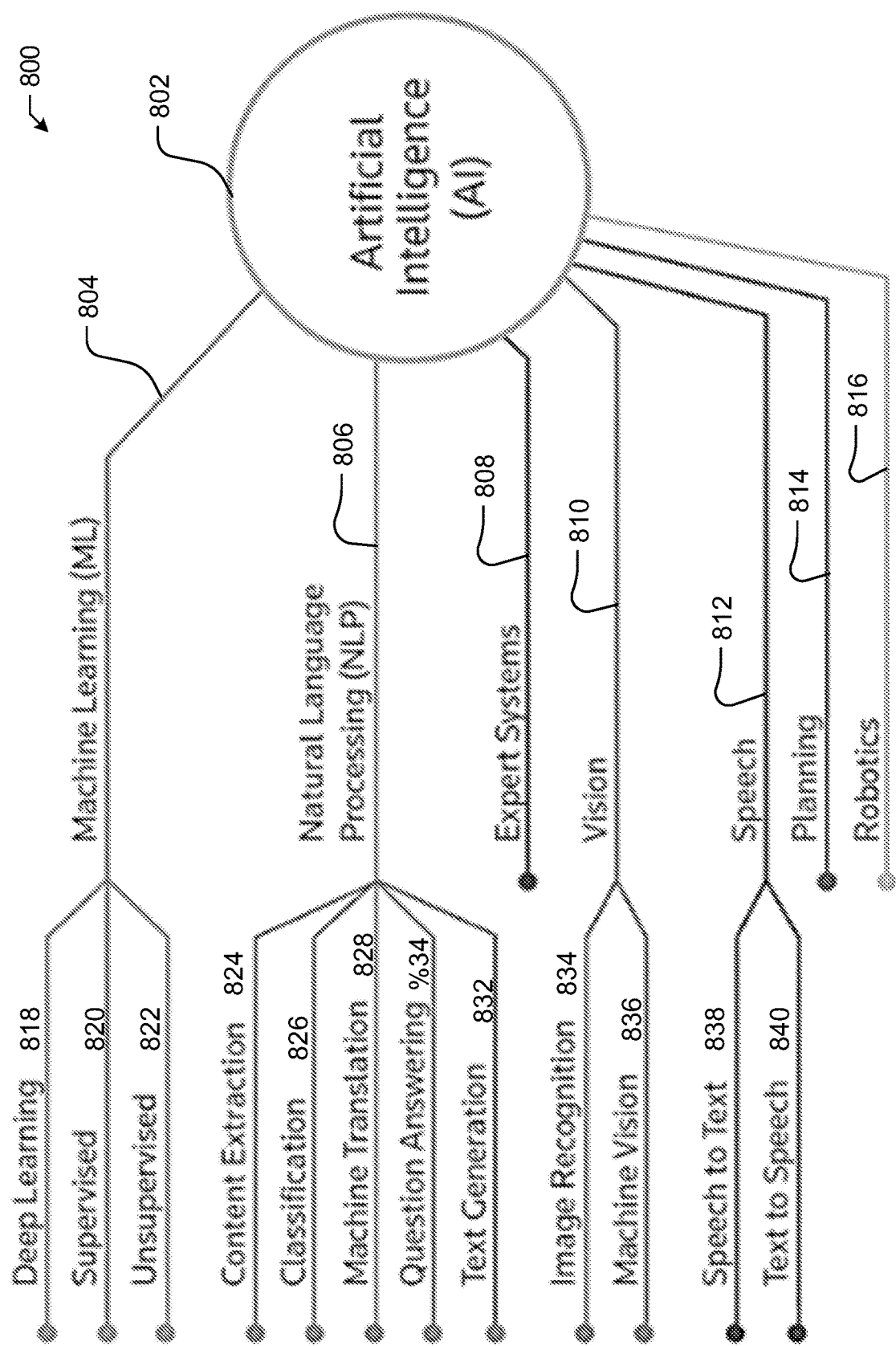
FIG. 8 illustrates a diagram of an example artificial intelligence (AI) architecture.

FIG. 8 illustrates a diagram 800 of an example artificial intelligence (AI) architecture 802 that may be utilized to perform determining whether an anomalous event has occurred on an electronic device, in accordance with the presently disclosed embodiments. In particular embodiments, the AI architecture 802 may be implemented utilizing, for example, one or more processing devices that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 8, the AI architecture 802 may include machine leaning (ML) algorithms and functions 804, natural language processing (NLP) algorithms and functions 806, expert systems 808, computer-based vision algorithms and functions 810, speech recognition algorithms and functions 812, planning algorithms and functions 814, and robotics algorithms and functions 816. In particular embodiments, the ML algorithms and functions 804 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 804 may include deep learning algorithms 818, supervised learning algorithms 820, and unsupervised learning algorithms 822.

In particular embodiments, the deep learning algorithms 818 may include any artificial neural networks (ANNs) that may be utilized to learn deep levels of representations and abstractions from large amounts of data. For example, the deep learning algorithms 818 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 820 may include any algorithms that may be utilized to apply, for example, what has been learned in the past to new data using labeled examples for predicting future events. For example, starting from the analysis of a known training dataset, the supervised learning algorithms 820 may produce an inferred function to make predictions about the output values. The supervised learning algorithms 820 can also compare its output with the correct and intended output and find errors in order to modify the supervised learning algorithms 820 accordingly. On the other hand, the unsupervised learning algorithms 822 may include any algorithms that may applied, for example, when the data used to train the unsupervised learning algorithms 822 are neither classified nor labeled. For example, the unsupervised learning algorithms 822 may study and analyze how systems may infer a function to describe a hidden structure from unlabeled data.

In particular embodiments, the NLP algorithms and functions 806 may include any algorithms or functions that may be suitable for automatically manipulating natural language, such as speech and/or text. For example, in particular embodiments, the NLP algorithms and functions 806 may include content extraction algorithms or functions 824, classification algorithms or functions 826, machine translation algorithms or functions 828, question answering (QA) algorithms or functions 830, and text generation algorithms or functions 832. In particular embodiments, the content extraction algorithms or functions 824 may include a means for extracting text or images from electronic documents (e.g., webpages, text editor documents, and so forth) to be utilized, for example, in other applications.

In particular embodiments, the classification algorithms or functions 826 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 828 may include any algorithms or functions that may be suitable for automatically converting source text in one language, for example, into text in another language. The QA algorithms or functions 830 may include any algorithms or functions that may be suitable for automatically answering questions posed by humans in, for example, a natural language, such as that performed by voice-controlled personal assistant devices. The text generation algorithms or functions 832 may include any algorithms or functions that may be suitable for automatically generating natural language texts.

In particular embodiments, the expert systems 808 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 810 may include any algorithms or functions that may be suitable for automatically extracting information from images (e.g., photo images, video images). For example, the computer-based vision algorithms and functions 810 may include image recognition algorithms 834 and machine vision algorithms 836. The image recognition algorithms 834 may include any algorithms that may be suitable for automatically identifying and/or classifying objects, places, people, and so forth that may be included in, for example, one or more image frames or other displayed data. The machine vision algorithms 836 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 812 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. In particular embodiments, the planning algorithms and functions 838 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 840 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A battery-powered electronic device comprising:
   one or more non-transitory computer-readable storage media;
   one or more processors coupled to the storage media;
   one or more sensors; and
   a microcontroller configured, while the battery-powered electronic device is in an idle mode, to:
      access one or more real-time sensor data associated with one or more hardware components of the battery-powered electronic device collected by the one or more sensors, each monitoring a corresponding hardware component of the battery-powered electronic device;
      determine, by a machine-learning model running on the microcontroller, that an anomalous event on the battery-powered electronic device has occurred by processing the one or more real-time sensor data associated with one or more hardware components of the battery-powered electronic device with the machine-learning model; and
      send, upon the determination that the anomalous event has occurred on the battery-powered electronic device, a notification regarding the anomalous event to an application running on the battery-powered electronic device, wherein the notification causes the battery-powered electronic device to switch from the idle mode to an active mode.

2. The battery-powered electronic device of claim 1, wherein the one or more real-time sensor data associated with one or more hardware components of the battery-powered electronic device comprise a current clock speed for one of the one or more processors, a current storage media utilization, a current battery level, a current network utilization, a current status for one of one or more displays, or a current device temperature.

3. The battery-powered electronic device of claim 1, wherein the microcontroller triggers a system interrupt to send the notification.

4. The battery-powered electronic device of claim 1, wherein the machine-learning model has been trained using sensor data collected from electronic devices having hardware configurations substantially similar to the battery-powered electronic device, and wherein the collected sensor data is labelled.

5. The battery-powered electronic device of claim 1, wherein the machine-learning model has been trained using sensor data collected from electronic devices having software configurations substantially similar to the battery-powered electronic device.

6. The battery-powered electronic device of claim 1, wherein the application takes further action to determine whether the anomalous event is associated with an abnormal operation mode of the battery-powered electronic device, and wherein the application provides a result of the determination to the microcontroller.

7. The battery-powered electronic device of claim 6, wherein the further action comprises:
    providing a visual notification to a user on one or more of displays associated with the battery-powered electronic device, wherein the visual notification comprises one or more choices for the user to provide a confirmation or a rejection to the visual notification; and
    receiving a selection among the one or more choices from the user.

8. The battery-powered electronic device of claim 6, wherein the microcontroller is further configured to:
    receive the result from the application; and
    update the machine-learning model based on the received result.

9. The battery-powered electronic device of claim 1, wherein the battery-powered electronic device is a mobile electronic device.

10. The battery-powered electronic device of claim 1, wherein the microcontroller is a sensor hub associated with the battery-powered electronic device.

11. The battery-powered electronic device of claim 1, wherein the battery-powered electronic device enters into the idle mode when the battery-powered electronic device has not detected any activity on installed applications for a pre-determined duration of time, wherein the battery-powered electronic device enters into the active mode when the battery-powered electronic device detects an activity on any of the installed applications, and wherein the microcontroller keeps the determining regardless of a mode the battery-powered electronic device is on.

12. The battery-powered electronic device of claim 1, wherein the one or more processors are configured to access second sensor data from external sensors including one or more cameras, touch sensors, microphones, or motion detection sensors, and wherein the second sensor data is not used by the microcontroller for determining that the anomalous event on the battery-powered electronic device has occurred.

13. A method comprising, by a microcontroller of a battery-powered electronic device, while the battery-powered electronic device is in an idle mode:
    accessing one or more real-time sensor data associated with one or more hardware components of the battery-powered electronic device collected by one or more sensors of the battery-powered electronic device, each monitoring a corresponding hardware component of the battery-powered electronic device;
    determining, by a machine-learning model on the microcontroller, that an anomalous event on the battery-powered electronic device has occurred by processing the one or more real-time sensor data associated with one or more hardware components of the battery-powered electronic device with the machine-learning model; and
    sending, upon the determination that the anomalous event has occurred on the battery-powered electronic device, a notification regarding the anomalous event to an application running on the battery-powered electronic device, wherein the notification causes the battery-powered electronic device to switch from the idle mode to an active mode.

14. The method of claim 13, wherein the microcontroller triggers a system interrupt to send the notification.

15. The method of claim 13, wherein the application takes further action to determine whether the anomalous event is associated with an abnormal operation mode of the battery-powered electronic device, and wherein the application provides a result of the determination to the microcontroller.

16. The method of claim 15, further comprising:
    receiving the result from the application; and
    updating the machine-learning model based on the received result.

17. A computer-readable non-transitory storage media comprising instructions executable by a microcontroller of a battery-powered electronic device, while the battery-powered electronic device is in an idle mode, to:
    access one or more real-time sensor data associated with one or more hardware components of the battery-powered electronic device collected by one or more sensors of the battery-powered electronic device, each monitoring a corresponding hardware component of the battery-powered electronic device;
    determine, by a machine-learning model running on the microcontroller, that an anomalous event on the battery-powered electronic device has occurred by processing the one or more real-time sensor data associated with one or more hardware components of the battery-powered electronic device with the machine-learning model; and
    send, upon the determination that the anomalous event has occurred on the battery-powered electronic device, a notification regarding the anomalous event to an application running on the battery-powered electronic device, wherein the notification causes the battery-powered electronic device to switch from the idle mode to an active mode.

18. The media of claim 17, wherein the microcontroller triggers a system interrupt to send the notification.

19. The media of claim 17, wherein the application takes further action to determine whether the anomalous event is associated with an abnormal operation mode of the battery-powered electronic device, and wherein the application provides a result of the determination to the microcontroller.

20. The media of claim 19, wherein the instructions are further executable by the microcontroller to:
    receive the result from the application; and
    update the machine-learning model based on the received result.

* * * * *